3,340,001
COMPOSITIONS AND METHOD FOR INHIBITING CORROSION OF METALS IN AQUEOUS SYSTEMS

Raymond Spencer Thornhill, Northwich, England, assignor to Imperial Chemical Industries Limited, London, England, a corporation of Great Britain
No Drawing. Filed Jan. 15, 1964, Ser. No. 337,743
Claims priority, application Great Britain, Jan. 22, 1963, 2,729/63
8 Claims. (Cl. 21—2.7)

This invention relates to compositions for dissolving in water to inhibit the corrosion of metals by water used as a cooling medium in recirculating and other systems, for example in the cooling systems of internal combustion engines particularly large marine and railway diesel engines.

Metals commonly found in the cooling systems of petrol and diesel engines are mild steel, cast iron, copper, solder, aluminium, and aluminium alloys, all of which are liable to be corroded by the action of water on them both when isolated from one another and when in the kind of metallic contact that sets up galvanic couples.

A substance that is known to inhibit corrosion of one metal may itself attack other metals. For example, sodium nitrite is a good inhibitor of the corrosion of mild steel and cast iron but it attacks solder. A second substance able to prevent sodium nitrite from attacking solder would remove this disadvantage of sodium nitrite but might itself attack one of the other metals. Likewise a third substance able to prevent the attack by the second substance might itself attack one of the remaining metals. Besides these possible individual effects of various substances on the metals there are the effects of the substances on each other. The corrosion-inhibiting effect of a mixture of two or more substances on certain metals may be diminished or destroyed by a further substance added to remove some undesirable feature of the mixture. Thus it is not possible to make up a composition able to inhibit corrosion of a given set of metals merely by choosing for each metal any substance known to be a specific inhibitor for that metal and then combining these specific inhibitors in a mixture.

The object of the present invention is to provide a composition, soluble in water, that will in cooling-water systems inhibit or at least reduce to a negligible degree corrosion of mild steel, cast iron, copper, solder, aluminium and aluminium alloys that are in contact with the water.

According to our invention we provide compositions of matter for dissolving in water used as a cooling medium in cooling systems for the purpose of protecting metals in contact with said water from corrosion thereby, comprising an alkali metal nitrate, and an alkali metal nitrite, and an alkali metal silicate or cyanate or urea, and sodium mercaptobenzthiazole or benztriazole.

By alkali metal is understood sodium and potassium, of which sodium is preferred.

By alkali metal silicate is understood compounds having the formula $M_2O \cdot (SiO_2)n$ where M represents the alkali metal and $n$ is greater than 1.0 and is preferably from 3.0 to 3.3.

Provided the concentrations in the cooling water of the components of the composition after the latter has been dissolved therein are greater than certain minimum values the relative proportions of the components in the composition are not critical. These minimum values are

| | Percent by weight |
|---|---|
| Sodium mercaptobenzthiazole | 0.0125 |
| Benztriazole | 0.0125 |
| Sodium or potassium nitrate | 0.02 |
| Sodium or potassium nitrite | 0.03 |
| Sodium or potassium silicate | 0.05 |
| Sodium or potassium cyanate | 0.10 |
| Urea | 0.10 |

The sum of the concentrations of the components of the composition in the water is thus seen to be at least 0.1125% by weight when an alkali metal silicate is among them, and at least 0.1625% by weight if alkali metal silicate is replaced by alkali metal cyanate or urea. A desirable upper limit for the sum of the concentrations of the components in the water is 1.0% by weight, and a suitable range for the sum is 0.20 to 0.50% by weight. A composition containing per part by weight of benztriazole or sodium mercaptobenzthiazole from 2 to 3 parts of alkali metal nitrate, from 3 to 4 parts of alkali metal nitrite and from 5 to 6 parts of alkali metal silicate, all parts by weight on an anhydrous basis, would when dissolved in water in the proportion of 0.20 to 0.50 part by weight of composition to 100 parts by weight of water meet these requirements. If alkali metal silicate were replaced by alkali metal cyanate or by urea the corresponding composition would contain per 2 parts by weight of benztriazole or sodium mercaptobenzthiazole, 3 to 4 of alkali metal nitrate, 5 to 6 of alkali metal nitrite and 10 to 11 of alkali metal cyanate or urea, all parts being by weight on an anhydrous basis.

Sodium and potassium nitrites are known to inhibit the corrosion of mild steel and cast iron by water but they attack solder such as is used in jointing copper components of radiators of petrol and diesel engines. From an examination of over sixty compounds potentially able to protect solder against attack by water alone we have found only five that can exert this protective action in the presence of sodium and potassium nitrites; these are sodium and potassium silicates, sodium and potassium cyanates, and urea, of which the silicates are the most effective and are to be preferred for most applications since water can under some conditions react with urea and with the cyanates to give traces of ammonia which is known to attack copper. On the other hand, if the water used as a cooling medium contains dissolved compounds that react with alkali metal silicates to give precipitates of silica, and if such precipitated silica would be objectionable in the cooling system, it can be advantageous to replace the alkali metal silicate by alkali metal cyanate or by urea and to rely on the sodium mercaptobenzthiazole or the benztriazole to protect copper in the system from attack by any traces of ammonia. Another method by which one can prevent the precipitation of unwanted silica, or at least reduce it to a negligible amount, is to have sodium ethylenediamine tetraacetate in the cooling water at a concentration of about 0.01% by weight. One can add this salt to the water before one adds the composition of the invention, or together with it, or if desired one can incorporate the salt in the composition as an additional constituent. Of the silicates, $M_2O \cdot (SiO_2)n$, where M represents Na or K, the preferred value of $n$ is from 3.0 to 3.3, since silicates in which $n$ is less, particularly from 1.0 to 2.0, though able to protect solder against attack by soluble nitrites are themselves alkaline enough to attack aluminium slightly. Sodium and potassium silicates can in certain circumstances have a slight corrosive effect on copper, but we find that this can be suppressed by means of sodium mercaptobenzthiazole or benztriazole which are unaffected by sodium nitrite.

A composition consisting of sodium nitrite, and sodium or potassium silicate and sodium mercaptobenzthiazole or benztriazole, when dissolved in water is corrosive towards aluminium and its alloys. Out of over twenty substances potentially able to protect aluminium from attack we have found only two, namely sodium and potassium nitrates, that are effective in presence of the other components of the composition.

The compositions of the invention are compatible with glycols, for example ethylene and propylene glycols, and with glycerol, and consequently may be used in cooling-water systems to which these polyols have been added as antifreeze agents.

The effects of the various inhibitors are illustrated in the following examples.

Example 1

Test pieces of solder (70 Pb/30 Sn) in the form of thin plates approximately 5 cms. square and fastened in galvanic contact to plates of mild steel of similar size, were agitated for 7 days in solutions at 80° C. and containing 0.01% by weight of sodium chloride and 0.12% by weight of sodium nitrite and various inhibitors as shown in Table I. The weight concentrations of the inhibitors were 0.10% except those of sodium benzoate and urea which were 1.87% and 0.20% respectively.

TABLE I

| Composition of solution, percent by wt. | | | Average weight loss of solder, mgm. |
|---|---|---|---|
| NaCl | NaNO₂ | Inhibitor | |
| 0.01 | | | 9.5 |
| 0.01 | 0.125 | | 67.0 |
| 0.01 | 0.125 | Sodium tetraborate, 0.10 | 59.2 |
| 0.01 | 0.125 | Disodium hydrogen phosphate, 0.10 | 56.8 |
| 0.01 | 0.125 | Trisodium phosphate, 0.10 | 49.7 |
| 0.01 | 0.125 | Sodium metaborate, 0.10 | 35.3 |
| 0.01 | 0.125 | Sodium benzoate, 1.87 | 12.5 |
| 0.01 | 0.125 | Sodium sebacate, 0.10 | 12.1 |
| 0.01 | 0.125 | Potassium chromate, 0.10 | 8.3 |
| 0.01 | 0.125 | Sodium silicate (SiO₂/Na₂O=3.3), 0.10 | 3.9 |
| 0.01 | 0.125 | Sodium silicate (SiO₂/Na₂O=3.0), 0.10 | 3.4 |
| 0.01 | 0.125 | Sodium silicate (SiO₂/Na₂O=1.0), 0.10 | 3.8 |
| 0.01 | 0.125 | Sodium mercaptobenzthiazole, 0.10 | 3.1 |
| 0.01 | 0.125 | Potassium cyanate, 0.10 | 1.8 |
| 0.01 | 0.125 | Sodium cyanate, 0.10 | 1.7 |
| 0.01 | 0.125 | Urea, 0.20 | 1.3 |

Example 2

Test pieces of aluminium in the form of thin plates approximately 5 cms. square and fastened in galvanic contact to plates of copper of similar size were agitated for 7 days in solutions at 80° C. and containing by weight 0.01% sodium chloride, 0.125% sodium nitrite, 0.19% sodium silicate (SiO₂/Na₂O=3.3), 0.05% benztriazole, and 0.10% of various inhibitors as shown in Table II.

TABLE II

| Additive | Average weight loss of aluminium, mgm. |
|---|---|
| None | 7.9 |
| Gum acacia | 13.1 |
| Soluble starch | 13.0 |
| Sodium alginate | 10.8 |
| Stearylamine | 10.8 |
| Sodium stearate | 8.2 |
| Sodium nitrate | 2.5 |
| Potassium nitrate | 2.9 |

Example 3

Test pieces of mild steel, cast iron, solder, copper and aluminium, in the form of thin plates approximately 5 cms. square, singly and coupled in various ways, were submerged for 3 days in recirculating systems at 80° C. containing sodium chloride and various inhibitors as shown in Table III, at concentrations expressed as percent by weight.

TABLE III

| Sodium Chloride, percent by wt. | Inhibitor, percent by wt. | | | | Average loss in wt. in mgm. | | | | | | | | | | | | | | |
|---|---|---|---|---|---|---|---|---|---|---|---|---|---|---|---|---|---|---|---|
| | Sodium Nitrite | Sodium Nitrate | Sodium Silicate (X), Urea (Y), Potassium Cyanate (Z) | Sodium Mercaptobenzthiazole | Benztriazole | Mild Steel | | Cast Iron | | Solder (70 Pb/30 Sn) | | | | | Copper | | | Aluminium | | |
| | | | | | | A | C | A | C | A | B | D | E | F | A | C | E | A | B | C |
| 0.01 | | | | | | 93.4 | 114.2 | 145.4 | 135.2 | 9.0 | 14.0 | 7.8 | 4.6 | 7.2 | 0.8 | 0.8 | 0.2 | 7.8 | 27.6 | 6.0 |
| 0.01 | 0.125 | 0.05 | | | | *0.2 | 0.0 | *0.2 | *0.4 | 47.6 | 36.4 | 68.8 | 3.4 | 68.0 | 1.8 | 1.6 | 0.2 | 0.0 | 7.4 | 2.6 |
| 0.01 | 0.125 | 0.02 | 0.198 (X) | | | Nil | Nil | Nil | *0.1 | 0.4 | 4.4 | 4.3 | 4.6 | 3.1 | 0.3 | 0.6 | 0.4 | Nil | 0.1 | Nil |
| 0.01 | 0.125 | 0.02 | 0.198 (X) | 0.05 | | 0.1 | 0.3 | 0.4 | 0.1 | 0.5 | 2.4 | 7.1 | 4.0 | 0.5 | *0.4 | +0.4 | *0.3 | *0.3 | *0.1 | 0.1 |
| 0.01 | 0.0025 | 0.02 | 0.0990 (X) | 0.025 | | Nil | Nil | 0.4 | Nil | 0.5 | 0.6 | 1.5 | 1.0 | 1.1 | *0.3 | *0.5 | *0.6 | 0.7 | *0.6 | 1.7 |
| 0.01 | 0.0312 | 0.02 | 0.0495 (X) | 0.0125 | | 1.5 | Nil | Nil | Nil | *0.6 | 0.6 | 0.5 | *0.4 | 1.2 | *0.2 | *0.7 | *0.6 | *0.1 | *2.0 | 0.1 |
| 0.01 | 0.125 | 0.05 | 0.10 (Y) | 0.05 | | 0.4 | Nil | 0.4 | *0.2 | 6.8 | 4.3 | 12.3 | *0.8 | 12.9 | *0.2 | *0.3 | *0.4 | 0.7 | 1.3 | 4.8 |
| 0.01 | 0.125 | 0.02 | 0.10 (Z) | 0.05 | | Nil | Nil | *0.2 | Nil | 3.4 | 5.1 | 7.4 | 1.8 | 7.0 | 0.4 | *0.3 | *0.2 | 3.2 | 18.2 | 19.0 |
| 0.01 | | | | | 0.05 | | | | | | | | | | | | | 13.8 | | |

*Gain of weight.  A = Uncoupled, B = Coupled to copper, C = Coupled to solder, D = Coupled to aluminium, E = Coupled to mild steel, F = Coupled to cast iron.

What I claim is:

1. A composition of matter for dissolving in water used as a cooling medium in cooling systems for the purpose of protecting metals in contact with said water from corrosion thereby comprising an alkali metal nitrate, an alkali metal nitrate, a substance able to protect solder against corrosion by aqueous solutions of alkali metal nitrites chosen from the group consisting of alkali metal silicates and cyanates and urea, and an organic nitrogen compound chosen from the group consisting of sodium mercaptobenzthiazole and benztriazole, said alkali metal silicates having the formula $M_2O \cdot (SiO_2)n$ wherein M represents the alkali metal and $n$ is greater than 1.0.

2. A composition of matter as claimed in claim 1 in which the alkali metal is sodium.

3. A composition of matter as claimed in claim 1 comprising sodium nitrate and sodium nitrite, and a sodium silicate having the molecular formula $Na_2O \cdot (SiO_2)n$ where $n$ is from 3.0 to 3.3 and an organic nitrogen compound chosen from the group consisting of sodium mercaptobenzthiazole and benztriazole.

4. A composition of matter as claimed in claim 3 in which the proportions of the constituents expressed as parts by weight on an anhydrous basis are 2 to 3 of sodium nitrate, 3 to 4 of sodium nitrite, and 5 to 6 of sodium silicate per part of an organic nitrogen compound chosen from the group consisting of sodium mercaptobenzthiazole and benztriazole.

5. A composition of matter as claimed in claim 3 which also contains sodium ethylenediamine tetraacetate.

6. A method of protecting metals in contact with water used as a cooling medium in cooling systems from corrosion thereby comprising dissolving in said water at least 0.02% of an alkali metal nitrate, at least 0.03% of an alkali metal nitrite, and at least 0.05% of an alkali metal silicate having the formula $M_2O \cdot (SiO_2)n$ wherein M represents the alkali metal and $n$ is greater than 1.0, and at least 0.0125% of an organic nitrogen compound chosen from the group consisting of sodium mercaptobenzthiazole and benztriazole, all said percentages being by weight.

7. A method of protecting metals in contact with water used as a cooling medium in cooling systems from corrosion thereby as claimed in claim 6 in which also present in the water is at least 0.01% by weight of sodium ethylenediamine tetraacetate.

8. A method of protecting metals in contact with water used as a cooling medium in cooling systems from corrosion thereby comprising dissolving in the water at least 0.02% of an alkali metal nitrate, and at least 0.03% of an alkali metal nitrite, at least 0.10% of a substance able to protect solder against corrosion by aqueous solutions of alkali metal nitrites chosen from the group consisting of alkali metal cyanates and urea, and at least 0.0125% of an organic nitrogen compound chosen from the group consisting of sodium mercaptobenzthiazole and benztriazole, all said percentages being by weight.

References Cited

UNITED STATES PATENTS 2,877,188  3/1959  Liddell _____ 252—389
3,110,684  11/1963  Miller _____ 252—389

MORRIS O. WOLK, *Primary Examiner.*

M. E. ROGERS, *Assistant Examiner.*